United States Patent [19]
Frankeny et al.

[11] Patent Number: 5,949,982
[45] Date of Patent: Sep. 7, 1999

[54] DATA PROCESSING SYSTEM AND METHOD FOR IMPLEMENTING A SWITCH PROTOCOL IN A COMMUNICATION SYSTEM

[75] Inventors: Richard Francis Frankeny, Elgin; Krisnamurthy Venkatramani, Austin, both of Tex.

[73] Assignee: International Business Machines Corporation, Armonk, N.Y.

[21] Appl. No.: 08/872,476

[22] Filed: Jun. 9, 1997

[51] Int. Cl.[6] .............................. G06F 13/00; H04J 3/24; H04Q 11/00
[52] U.S. Cl. .................................... 395/312; 395/311
[58] Field of Search ................................. 395/311, 312, 395/280, 800.29, 200.62, 200.68; 340/386

[56] References Cited

U.S. PATENT DOCUMENTS

| | | | |
|---|---|---|---|
| 4,663,620 | 5/1987 | Paul et al. | 340/825.5 |
| 5,084,836 | 1/1992 | Yamaguchi | 395/800.29 |
| 5,404,461 | 4/1995 | Olnowich et al. | 395/325 |
| 5,418,911 | 5/1995 | Zilka et al. | 395/325 |
| 5,469,432 | 11/1995 | Gat | 370/60 |
| 5,487,155 | 1/1996 | Drewry et al. | 395/311 |
| 5,526,497 | 6/1996 | Zilka et al. | 395/310 |
| 5,530,813 | 6/1996 | Paulsen et al. | 395/312 |
| 5,533,201 | 7/1996 | Benton et al. | 395/280 |
| 5,555,543 | 9/1996 | Grohoski et al. | 395/200.39 |
| 5,568,064 | 10/1996 | Beers et al. | 326/31 |
| 5,578,939 | 11/1996 | Beers et al. | 326/30 |
| 5,742,761 | 4/1998 | Olnowich et al. | 395/200.8 |

*Primary Examiner*—Gopal C. Ray
*Attorney, Agent, or Firm*—Winstead Sechrest & Minick P.C.; Casimer K. Salys

[57] ABSTRACT

A cross-bar switch is implemented in a multiprocessor system which allows for bidirectional communication between a device and the cross-bar switch such that information may be transferred simultaneously between both. The cross-bar switch is not informed of the integrated circuit device's actions before a communication link is established. Rather, the bidirectional transmitter utilized herein allows the transmission of control information to the cross-bar switch while the cross-bar switch communicates to the integrated circuit device over the same transmission lines. Such bidirectional communication allows the designer of a multiprocessor communication system to minimize control lines and transmit both data and control signals over the same communication bus.

20 Claims, 6 Drawing Sheets

Figure 2

DATA PROCESSING SYSTEM AND METHOD FOR IMPLEMENTING A SWITCH PROTOCOL IN A COMMUNICATION SYSTEM

CROSS-REFERENCE TO RELATED APPLICATIONS

The present patent application is related to the following applications:

Ser. No. 08/703,317, entitled "REFERENCE SIGNAL GENERATION IN A SWITCHED CURRENT SOURCE TRANSMISSION LINE DRIVER/RECEIVER SYSTEM" (Attorney Docket No. AT9-96-043), filed Aug. 26, 1996 issued as U.S. Pat. No. 5,793,223;

Ser. No. 08/703,318, entitled "TRANSMISSION LINE DRIVER CIRCUIT FOR MATCHING TRANSMISSION LINE CHARACTERISTIC IMPEDANCE" (Attorney Docket No. AT9-96-044), filed Aug. 26, 1996 issued as U.S. Pat. No. 5,760,601; and Ser. No. 08/770,602, entitled "CURRENT SOURCE BASED MULTI-LEVEL BUS" (Attorney Docket No. AT9-96-155), filed Dec. 19, 1996.

Each of the above references is assigned to the assignee of the present patent application and is hereby incorporated by reference herein.

TECHNICAL FIELD

The present invention relates in general to communications between multiple data processors and, more particularly, to communications between data processors using a switch protocol.

BACKGROUND INFORMATION

As data processing communication systems have expanded to incorporate multiple processors that share a common core of memory or common input/output (I/O) devices, the performance associated with the communication system must be continually improved to allow for greater data processing capacity and faster speeds. In an attempt to optimize performance of the data processing communication system, many techniques have been developed to implement communication between multiple data processors and core memory or input/output devices.

One such technique implements a shared memory bus to allow a plurality of data processors to access a memory. When a shared memory bus is implemented, an arbitration operation, which utilizes separate signals for requesting and acknowledging control of the shared bus, is required to determine which of the plurality of data processors will access the memory at a given time. While arbitration is a useful methodology for allowing data processors to communicate with shared devices in a communication system, arbitration implementations require a significant amount of overhead, both in time and circuit costs. For example, the time required to perform the arbitration function must necessarily be factored into a total time required for the data processor to communicate with the memory. Additionally, such arbitration operations must be implemented using logic circuitry which adds additional overhead costs to the entire system.

In data processing communication systems which do not tolerate the time consumption associated with an arbitration scheme, a dedicated, rather than shared, memory bus is implemented for each data processor. This dedicated memory bus connects each of the data processors to the common memory or input/output device. However, because this approach requires separate busses for each data processor, it is costly and complicated. Therefore, it is typically used in specialized applications having specified and rigid standards.

In other high performance data communication systems, a switch architecture is implemented to allow a data processor to communicate with the shared memory or input/output devices without the use of a shared bus or a dedicated bus. In a switch architecture, a first data processor communicates with a first input/output device and a second data processor communicates with a first memory in parallel because each data processor can be switched to a unique path. However, when both the first and second data processor want to communicate with the same memory device, latency is introduced in the switching architecture as these operations may not be performed in parallel because a single unique path is desired to be used by both data processors. In this instance, latency is introduced during an ensuing arbitration operation which establishes which of the data processor and the memory or other device has access to the unique data path.

While prior art techniques effectively allow multiple data processors to communicate with a shared resource, it is desirable to have a system which minimizes a latency associated with determining whether or when such communication operations should take place. Therefore, it is desirable to have a data communication system which minimizes such latency and optimizes the data communication system for efficient performance.

SUMMARY OF THE INVENTION

The previously mentioned needs are fulfilled with the present invention. Accordingly, there is provided, in a first form, a data processing system. The data processing system includes a first data processor, a first information bus having a first end connected to the first data processor and a second end. A first cross-bar switch is connected to the second end of the first information bus. The cross-bar switch concurrently communicates a first data value with the first data processor and a first control value with the first data processor using the first information bus.

Additionally, there is provided, in a second form, a bidirectional cross-bar switch. The bidirectional cross-bar switch includes a first information bus for providing a first plurality of information values and a first input circuit for receiving a second plurality of information values. A bidirectional circuit is connected to the first information bus to receive the first plurality of information values and is connected to the first input circuit to receive the second plurality of information values. The bidirectional circuit receives the first plurality of information values on the first information bus while concurrently transmitting the second plurality of information values on the first information bus.

Furthermore, there is provided, in a third form, a method for communicating information using a first switch in the data processing system. The method includes the steps of connecting a first data processor to a first end of a first information bus and connecting the first switch to a second end of the first information bus. The first switch is enabled to communicate a first data value with the first data processor. The first switch is enabled to communicate a first control value with the first data value using the first information bus.

These and other features, and advantages, will be more clearly understood from the following detailed description taken in conjunction with the accompanying drawings.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
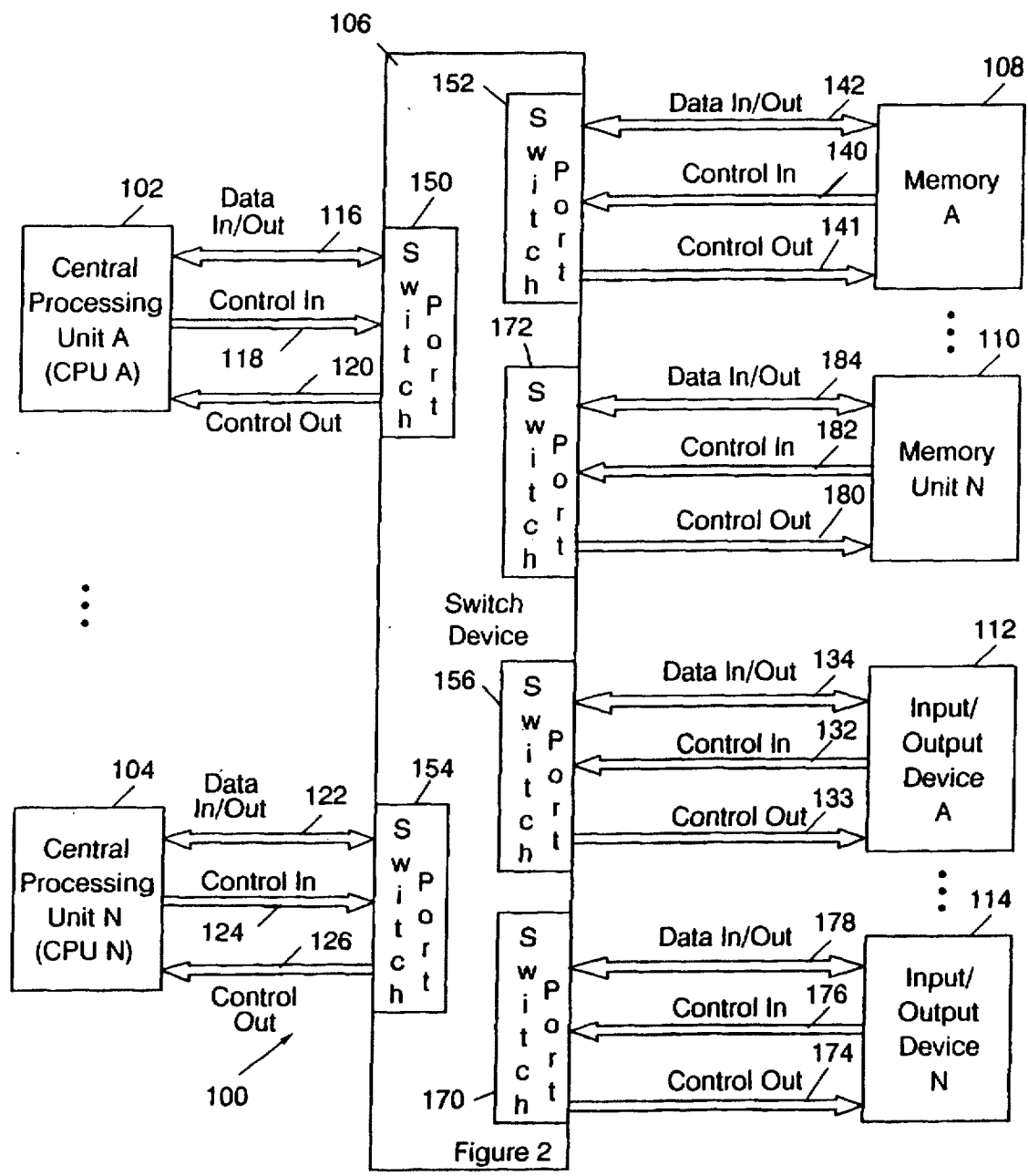
FIG. 1 justrates, in block diagram form, a communication system in accordance with on embodiment of the present invention.

In the design of cross-bar switches for controlling communication between computing, storage, and processing elements, it is often necessary to develop a protocol for establishing the direction of communication between an element and switch. Each communicating element must establish a receive or a transmit priority with the switch. An example of a communication protocol has been provided in U.S. patent application Ser. No. 08/352,660, filed Dec. 9, 1994, which is hereby incorporated by reference herein. Also, different communicating devices may have a higher priority with the switch and that higher priority should be accounted for in determining when and what communications will be performed. Furthermore, in switch-type architectures where a switch is controlling the communication between processors and distributed memory elements, communication may take a circuitous route if a data processor is trying to locate stored information that is of a latest level. Some multiprocessing systems have very wide communication channels which require the switch function to be distributed over several integrated circuit devices, wherein each of the integrated circuit devices controls a portion of the communication bus. Control for these integrated circuit devices is provided by a central controller and each of the integrated circuit devices transmits control information to the controller. In turn, the controller transmits data to each switch integrated circuit device or each switch integrated circuit device receives control information from another integrated circuit device. In either instance, the routing for the signals and external wiring can be very difficult.

The present invention provides a system and method for implementing a cross-bar switch in a multiprocessor system. The disclosed invention implements a transmission network that allows bidirectional communication between a device and the cross-bar switch such that information may be transferred simultaneously. Furthermore, the cross-bar switch does not have to be informed of the integrated circuit device's actions before a communication link may be established. In the present invention, the switch protocol may be embedded in a switch integrated circuit device or in a communication path between the switch integrated circuit device and a data processor. The concurrent bidirectional transmitter utilized herein allows a data processor to transmit information to a second device, while receiving information from a third device over the same transmission lines. This allows a designer of a multiprocessor communication system to minimize control lines and transmit both data and control signals over the same communication bus. Therefore, a plurality of control lines may be replaced by a single signal which notifies the switch that the information being received is control information or data information.

Therefore, because of the simultaneous bidirectional capability of the present invention, a new transfer protocol between multiple devices may be constructed such that required control information may be reduced to an interpretive function. The function of the control information is to determine what type of information is on an input/output bus, data or control, and what actions should be taken with this information on the input/output bus. Because the present invention allows communication to occur bidirectionally, there is no latency in waiting for a data transmission to be completed before a new operation is initiated. The implementation and description of operation of the present invention will subsequently be described in greater detail.

During a following description of the implementation of the invention, the terms "assert" and "negate," in various grammatical forms thereof, are used to avoid confusion when dealing with a mixture of "active high" and "active low" logic signals. "Assert" is used to refer to the rendering of a logic signal or register bit into its active, or logically true, state. "Negate" is used to refer to the rendering of a logic signal or register bit into its inactive, or logically false state. Furthermore, in the following description, numerous specific details are set forth such as specific word or byte lengths, etc. to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views.

Description of Connectivity

Before describing the operation of the present invention in greater detail, a description of connectivity of a portion of the elements implemented by the present invention will be described. Refer now to FIG. 1. FIG. 1 illustrates a data processing communication system 100. Communication system 100 comprises a central processing unit A (CPU A) 102 through a central processing unit N (CPU N) 104. CPU A 102 is coupled to a first switch port 150 switch device 106 via a Data I/O (Input/Output) bus 116, a Control In bus 118, and a Control Out bus 120. CPU N 104 is coupled to a switch port 154 via a Data I/O bus 122, a Control In bus 124, and a Control Out bus 126. Communication system 100 also comprises a plurality of memories, memory A 108 through memory N 110. Communication system 100 also comprises a plurality of input/output devices, input/output device A 112 through input/output device N 114. A switch port 152 of switch device 106 is coupled to memory A 108 via a Data I/O bus 142, a Control In bus 140, and a Control Out bus 141. A switch port 172 of switch device 106 is coupled to memory N 110 via a Data I/O bus 184, a Control In bus 182, and a Control Out bus 180. A switch port 156 of switch device 106 is coupled to I/O (input/output) device A 112 via a Data I/O bus 134, a Control In bus 132, and a Control Out bus 133. Similarly, a witch port 170 is coupled to I/O device N 114 via a Data I/O bus 178, a Control In bus 176, and a Control Out bus 174.

Figure 2:
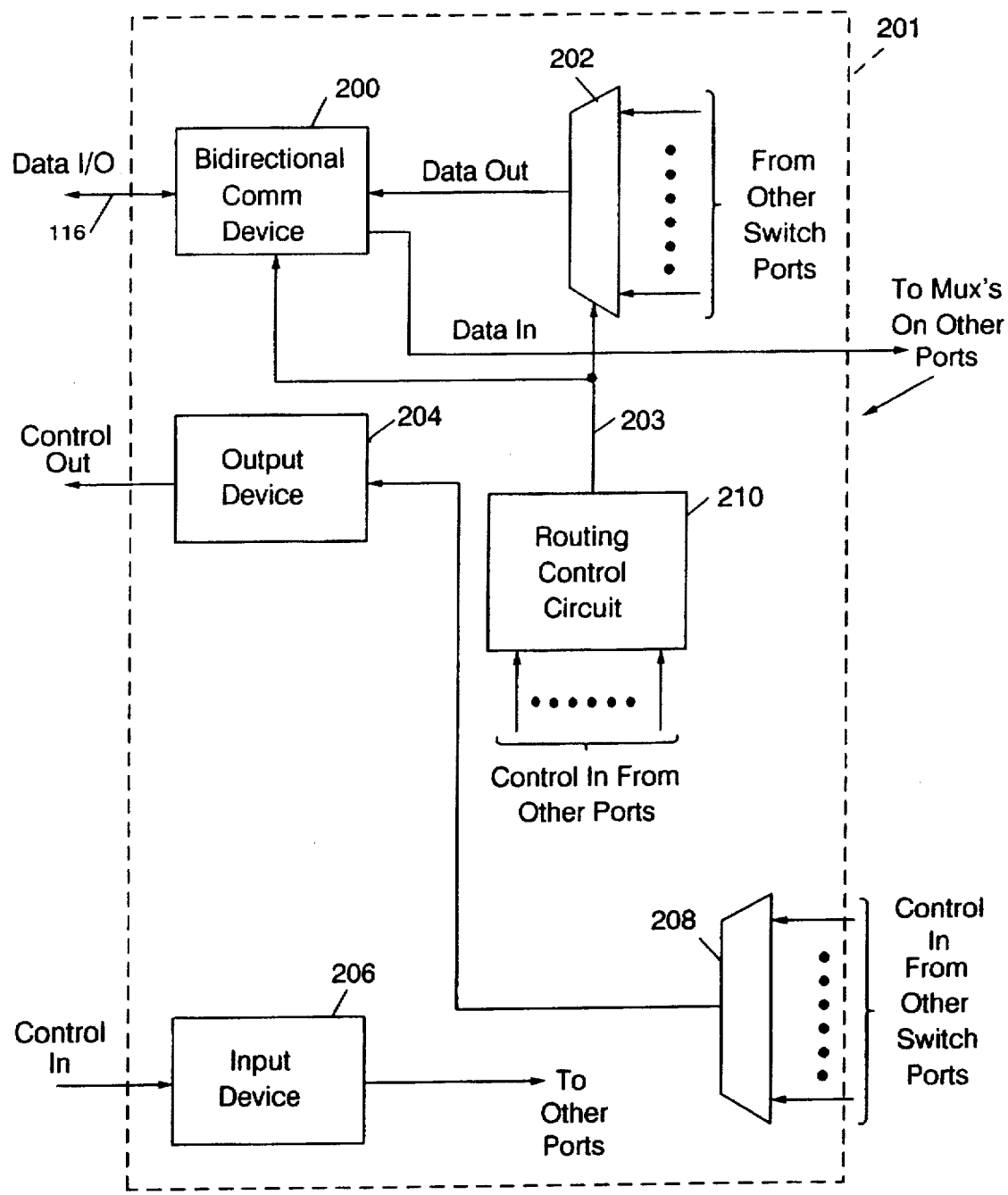
FIG. 2 illustrates, in block diagram form, a switch device of the data processing system of FIG. 1.

A switch port (150, 152, 154, 156, 170, 172) of switch device 106 is illustrated in greater detail in FIG. 2. Each switch port comprises a bidirectional communication device 200, a multiplexer 202, an output device 204, an input device 206, a multiplexer 208, and a routing control circuit 210. It should be noted that switch ports 152, 154, 156, 170, and 172 have a similar configuration.

In FIG. 2, a Data I/O bus 116 is coupled to bidirectional communication device 200. Bidirectional communication device 200 is coupled to multiplexer 202 to receive a Data Out signal and is coupled to multiplexers (such as multiplexer 208) in another one of the plurality of switch ports in switch device 106. Routing control circuit 222 is coupled to a select input of multiplexer to provide a multiplexer select signal 203. Multiplexer 202 receives a plurality of data inputs from each of the remaining plurality of switch ports. Similarly, routing control circuit 210 and multiplexer 208 receive a plurality of Control In signals from each of the remaining plurality of switch ports. Multiplexer 208 is coupled to output device 204 to provide a Control Out signal.

Figure 3:
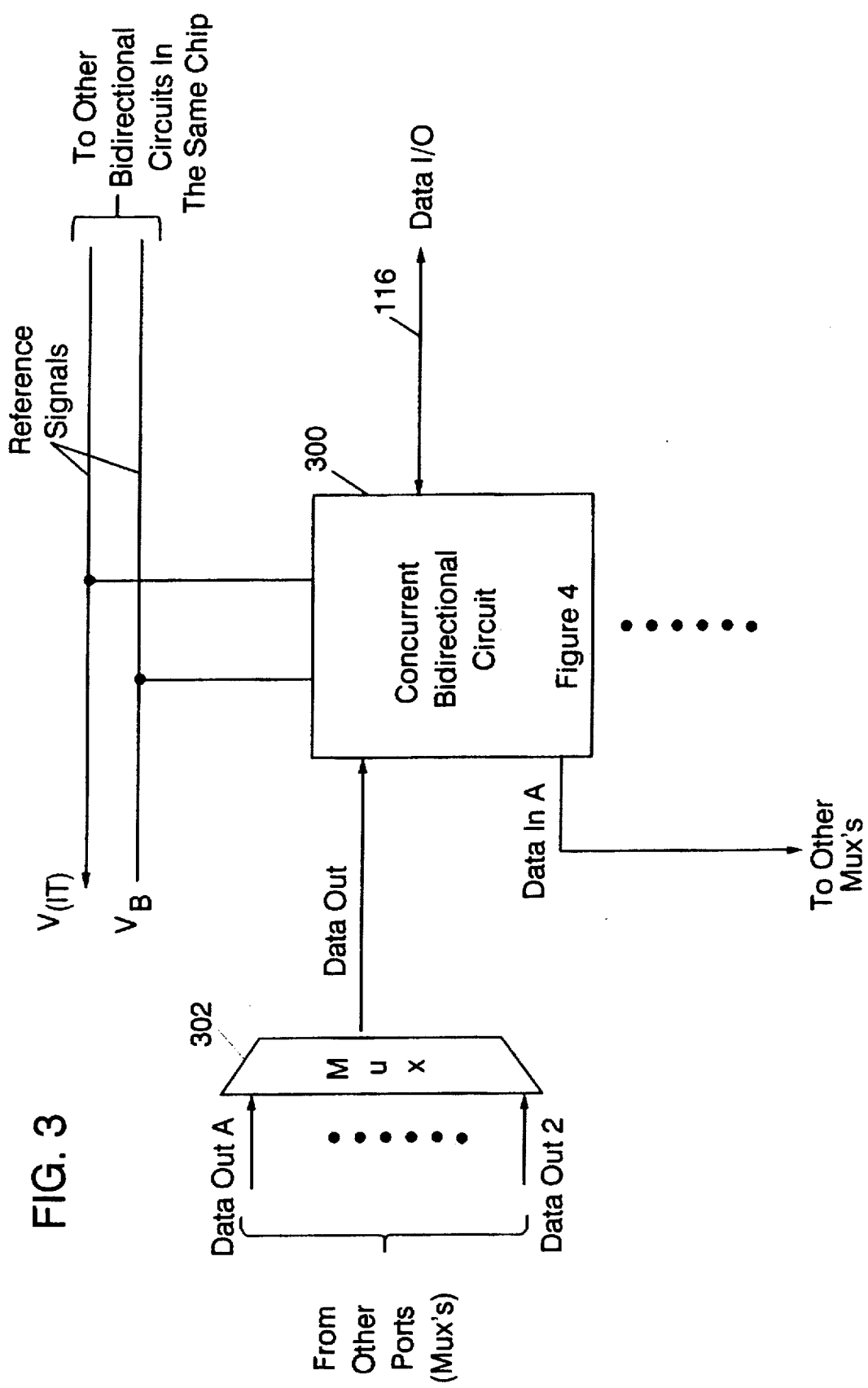
FIG. 3 illustrates, in block diagram form, a portion of a bidirectional communication device of FIG. 2.

A portion of concurrent bidirectional communication device 200 is illustrated in greater detail in FIG. 3. The portion of bidirectional communication device 200 comprises a concurrent bidirectional circuit 300 and a multiplexer 302. In FIG. 3, Data I/O bus 116 is coupled to bidirectional circuit 300. Additionally, $V_{TT}$ signal and a $V_B$ signal are both provided to concurrent bidirectional circuit 300. A plurality of Data Out A through Data Out Z signals are coupled to multiplexer 302. A multiplexer select signal 203 is coupled to multiplexer 302. Concurrent bidirectional circuit 300 provides a Data In signal.

Figure 4:
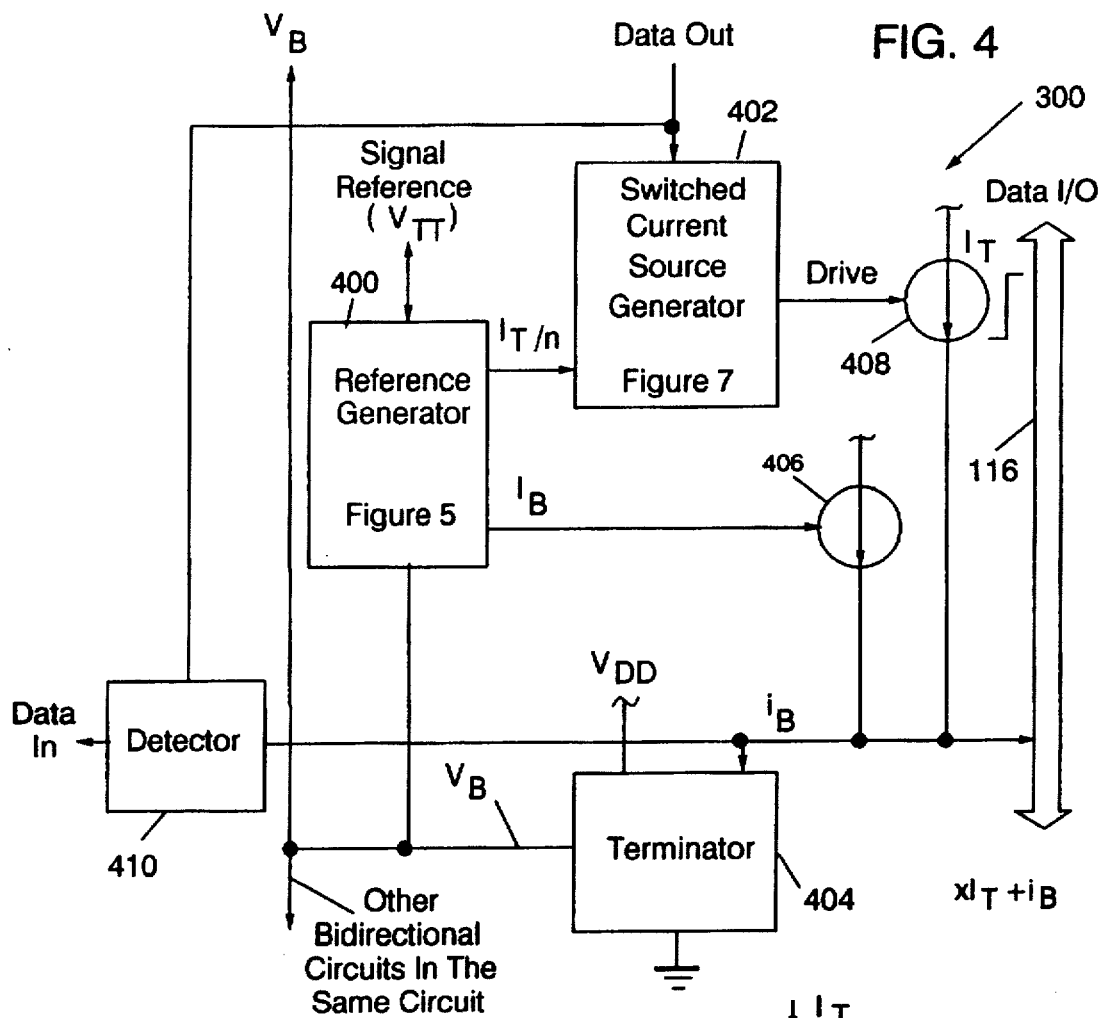
FIG. 4 illustrates, in block diagram form, a bidirectional circuit of FIG. 3.

FIG. 4 illustrates a portion of concurrent bidirectional circuit 300 in greater detail. The portion of bidirectional circuit 300 comprises a reference generator 400, a current source generator 402, a terminator 404, a current source 406, a current source 408, and a detector 410. The reference signal, $V_{TT}$, is provided to reference generator 400. Reference generator 400 is coupled to current source generator 402 to provide an $$\frac{I_T}{n}$$

signal. Reference generator 400 is coupled to current source 406 to provide an $I_B$ signal. Reference generator 400 is coupled to terminator 404 to provide a $V_B$ signal. Current source generator 402 and detector 410 receive the Data Out signal. Current source generator 402 is coupled to current source 408 to provide an $I_T$ signal. Each of current sources 406 and 408 is coupled to terminator 404 and detector 410 provides the Data In signal.

Reference generator 400 comprises a terminator 500, a terminator 502, a terminator 504, an amplifier 506, a transistor 508, a transistor 510, a transistor 512, a transistor 514, a transistor 516, an amplifier 518, a resistor 520, a resistor 522, a transistor 524, a transistor 526, a resistor 528, an amplifier 530, and a transistor 532. A first terminal of each of transistors 508, 510, 512, 514, 524, and 526 is coupled to a first reference voltage. A second electrode of transistor 508 is coupled to a second electrode of transistor 510, a second electrode of transistor 512, a second electrode of transistor 514, a third terminal of transistor 514, a first terminal of transistor 516, and a first terminal of resistor 534. A third terminal of transistor 508 is coupled to terminator 500 and a first input of amplifier 506. Terminator 500 is coupled to a reference voltage $V_{DD}$ and a $V_B$ signal. An output of amplifier 506 provides the $V_B$ signal. An output of amplifier 506 is coupled to a first terminal of terminator 502 and a first terminal of terminator 504. A second terminal of terminator 502 is coupled to a reference voltage. A third terminal of terminator 502 is coupled to the reference signal. The reference signal is also coupled to a second terminal of amplifier 506, a third terminal of transistor 510, and a first input of amplifier 518. A second terminal of terminator 504 is coupled to a reference voltage $V_{DD}$. A third terminal of terminator 504 is coupled to a second terminal of 526 to communicate an $I_B$ value. The second terminal of transistor 526 is coupled to a first input of buffer 530. A third terminal of transistor 526 is coupled to a second terminal of transistor 524 and a third terminal of transistor 524. The third terminal of transistor 524 is coupled to a first terminal of resistor 528 and provides a $I_B$ value. A second terminal of transistor 528 is coupled to a reference ground voltage. Similarly, a second terminal of transistor 532 is coupled to a reference ground voltage. An output of amplifier 530 is coupled to a third terminal of transistor 532. A third terminal of transistor 512 is coupled to a first input of buffer 518 and a first terminal of resistor 520. A second terminal of resistor 520 is coupled to a first terminal of resistor 522 and a second input of amplifier 530. A second terminal of resistor 522 is coupled to a reference ground voltage. An output of amplifier 518 is coupled to a second terminal of transistor 516. A third terminal of transistor 516 is coupled to a reference ground voltage. A second terminal of resistor 534 is coupled to a reference ground voltage.

Figure 5:
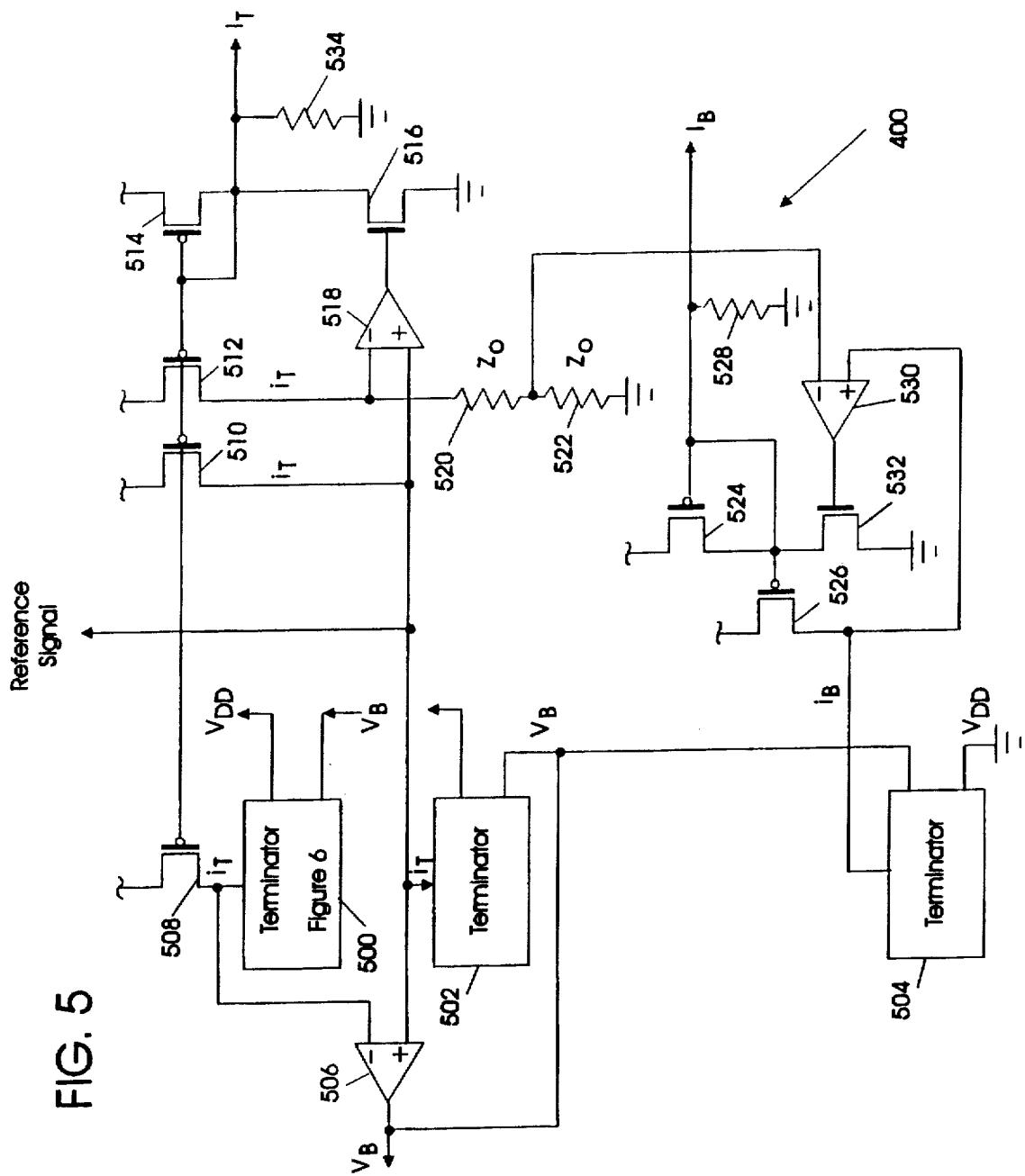
FIG. 5 illustrates, in block diagram and logic diagram form, a reference generator in accord with FIG. 4.

In the reference generator illustrated in FIG. 5, each of transistors 508, 510, 512, 514, 524, and 526 is a p-channel transistor, whereas transistor 532 is an n-channel transistor. However, it should be noted that this is but one embodiment of the present invention and different types of transistors made using different manufacturing technologies may be used to implement the reference generator function of the present invention.

Figure 6:
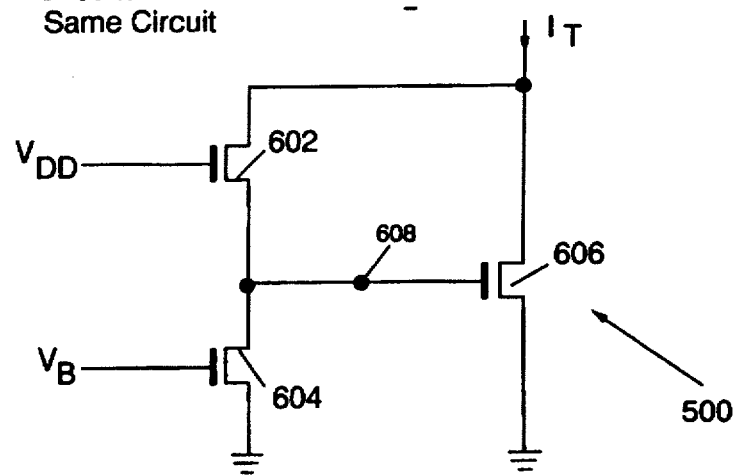
FIG. 6 illustrates, in circuit diagram form, a terminator of FIG. 5.

FIG. 6 illustrates a portion of terminator 500 in greater detail. The portion of terminator 500 comprises a transistor 602, a transistor 604, and a transistor 606. An x $I_T+i_B$ value is provided to a first terminal of each of transistors 602 and 606. It should be noted that x $I_T$ is variable and may have a value of 0, $I_T/n$, or $I_T$. Furthermore, $i_B$ is a bias current. A $V_{DD}$ signal is provided to a second terminal of transistor 602. A third terminal of transistor 602 is coupled to a first terminal of transistor 604 and a second terminal of transistor 606. A third terminal of transistor 606 is coupled to a reference ground voltage. A second terminal of transistor 604 is coupled to a $V_B$ signal. A third terminal of transistor 604 is coupled to a reference ground voltage.

Figure 7:
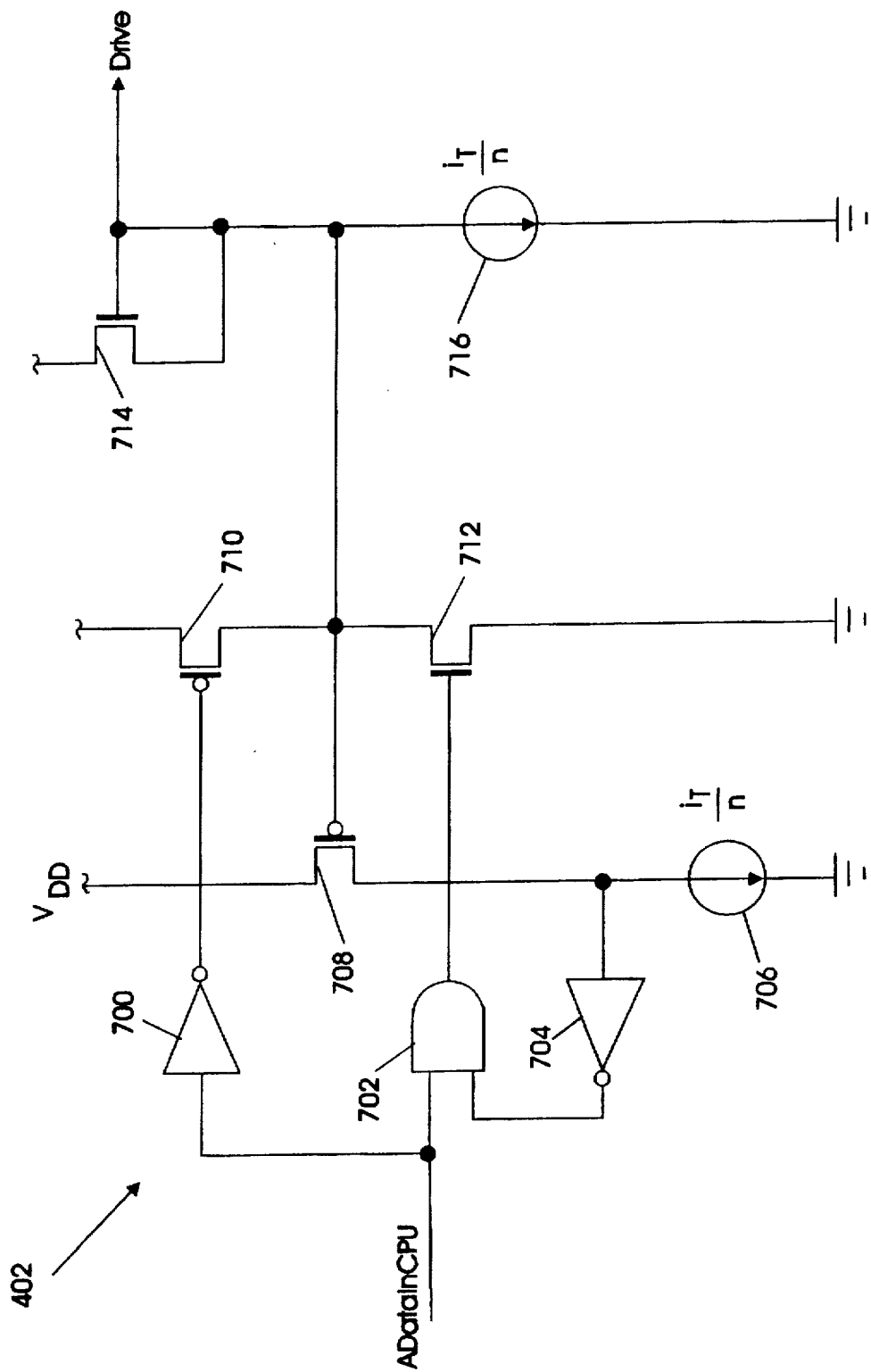
FIG. 7 illustrates, in logic diagram form, a current source generator of FIG. 4.

A portion of current source generator 402 of FIG. 4 is illustrated in greater detail in FIG. 7. The portion of current source generator 402 comprises an inverter 700, an AND gate 702, an inverter 704, a current source 706, a transistor 708, a transistor 710, a transistor 712, a transistor 714, and a current source 716. The Data Out signal is provided to an input of inverter 700 and a first input of AND gate 702. An output of inverter 700 is coupled to a first terminal of transistor 710. A second terminal of transistor 710 is coupled to a reference voltage. A third terminal of transistor 710 is coupled to a first terminal of transistor 712, and a first terminal of transistor 708, a first terminal and a second terminal of transistor 714, and an input to current source 716. A third terminal of transistor 714 is coupled to the reference voltage value. Transistor 714 provides a drive signal. A second terminal of current source 716 is coupled to a reference ground voltage. An output of AND gate 702 is coupled to a second terminal of transistor 712. A third terminal of transistor 712 is coupled to a reference ground voltage. A third terminal of transistor 708 is coupled to an input of inverter 704 and a first terminal of current source 706. A second terminal of current source 706 is coupled to a reference ground voltage. An output of inverter 704 is coupled to a second input of AND gate 702.

The connectivity of each of the elements of the present invention has been provided above. Subsequently, a description of operation of the communication system of the present invention will be provided.

Description of Operation

The present invention implements communication system 100 as a cross-bar switch which controls communication between computing, storage, and processing elements. Unlike prior art implementations of cross-bar switches, the present invention utilizes a concurrent bidirectional transmitter which allows bidirectional communication between a device and the cross-bar switch so that information may be transferred between the two simultaneously. Furthermore, the cross-bar switch is not required to have information about the device's actions before a communication link between the two may be established. The concurrent bidirectional transmitter implemented in the cross-bar switch of data processing system 100 allows the transmission of control information by the switch, while the switch receives data from the device over the same transmission lines. Stated another way, switch device 106 of communication system 100 provides a means for both receiving information from and transmitting information to a device concurrently. Furthermore, the bidirectional transmitter implemented herein also allows switch 106 to allow two communicating devices to send data concurrently. The two devices to which switch device 106 routes information can subsequently individually decode the data sent to each.

Switch device 106 effectively allows a first information value to be sent and a second information value to be received using a same set of data and control lines. Such bidirectional and concurrent data and control communication allows a designer of communication system 100 to eliminate arbitration lines such as those typically used in prior art systems. In addition to the arbitration lines and signals required by prior art implementations, the present invention also provides a methodology for eliminating the latency associated with the arbitration procedures of prior art implementations. Specifically, because both operations may be performed concurrently, a device is not required to wait to receive additional information when it is transmitting information to another device. Additionally, control information required for implementing an arbitration operation is no longer required. Instead, the present invention provides a single line (the multiplexer select signal) to indicate whether information provided by a device is a control or a data value.

Furthermore, the advantages of the present invention are further emphasized by the realization that communication systems, such as communication system 100, are comprised of multiple chips, which each require multiple arbitration control lines. Therefore, by replacing the multiple arbitration lines required in prior art implementations with a single signal which indicates whether a signal is control or data information, a significant amount of overhead associated with routing signals is conserved.

It should also be noted that the present invention requires the use of a reference signal to each of the switches within switch device 106. The use of this reference signal is required as the switch is one entity, generally comprised of multiple chips, which each include a portion of the bus. By the use of this reference signal, each of the multiple chips that make up a bus will have a reference generator for each port therein. However, this reference signal may be daisy-chained between each of the plurality of switches comprising switch device 106 and does not require a significant amount of circuit area or overhead. Their reference signal is provided to match an impedance of each of the plurality of switches of switch device 106.

Consider an example in which the switch includes a plurality of chips which implement a bus having 36 bits. In this example, the 36 bits of processor N's bus are partitioned between nine chips, each having 4 bits of the bus. Since processor N is communicating with nine chips, each of these chips must have a unique reference generator for each port daisy chained together and connected to processor N's reference signal. Since connectivity is accomplished by the switch via the nine chips, each chip would have N reference lines daisy chained and each of these N reference lines would be uniquely connected to one of the N communicating devices. The use of the reference signal will subsequently be described in greater detail.

To describe operation of communication system 100 of FIG. 1, an example will be provided herein. In this example, assume that CPU A 102 reads information from I/O device N 114. To initiate the read operation, CPU A 102 transmits address and control information on Data I/O bus 116. Additionally, CPU A 102 asserts a single line on a Control In bus 120 to indicate that control information is being provided. In this first example, assume that CPU A 102 is coupled to switch port 150 within switch device 106. Switch port 150 is illustrated in greater detail in FIG. 2.

Upon receipt of the address and control information provided via Data I/O bus 116, bidirectional communication device 200 provides a Data In signal to multiplexers, such as multiplexer 202, in a remaining portion of the plurality of switch ports 152, 154, 156, 170, and 172. Concurrently, Control In bus 118 provides control information to each of the remaining plurality of switch ports 152, 154, 156, 170 and 172. As CPU A 102 reads information from I/O device 114, routing control circuit 210 of switch 205 will enable multiplexer 202 to select the Data Out signal output by an input device (such as input device 206) of switch port 170, which corresponds to I/O device N 114, to be provided to bidirectional communication device 200 of switch 150. Multiplexer 208 also selects a Control In signal to be output as the Control Out signal which provides control information to CPU A 102. Bidirectional communication device 200 also provides the Data In from CPU A 102 to switch port 170, which corresponds to I/O device N 114. It should be noted that routing control circuit 210 controls multiplexer 202 in response to a plurality of Control In signals provided thereto from the remaining plurality of switch ports 152, 154, 156, 170, and 172. Operation of such a routing control circuit is described in U.S. Pat. No. 5,519,837, issued May 21, 1996, which is hereby incorporated by reference herein.

While information is being provided from CPU A 102 to I/O device 114 via switch ports 150 and 170, assume that information to be transmitted from memory A 108 to CPU A 102 is provided to a switch port 152 corresponding to memory A 108. In this instance, memory A 108 provides information to be transmitted to a bidirectional communication device in switch port 152 via Data I/O bus 142 and Control In bus 140. Within switch port 152, the bidirectional communication device therein passes the memory information to multiplexer 202 of switch port 150, as well as similarly situated multiplexers in the remaining plurality of switch ports. Routing control circuit 210 receives a plurality of Control In signals from memory A 108 and each of the remaining plurality of devices coupled to switch device 106. Subsequently, by providing multiplexer select signal 203 to multiplexer 202, routing control circuit 210 enables multiplexer 202 to provide the memory information provided by memory A 108 to bidirectional communication device 200 as the Data Out signal. Bidirectional communication device 200 then provides the memory information to CPU A 102 via Data I/O bus 116. Bidirectional communication device 200 functions in such a manner that information may be communicated both to and from CPU A 102. Operation of the bidirectional communication devices of the present invention, such as bidirectional communication device 200, will subsequently be described in greater detail.

After information from memory A 108 is output from bidirectional communication device 200 to CPU A 102, CPU A 102 decodes the address and control information and returns data desired by memory A 108 via Data I/O bus 116. Bidirectional communication device 200 provides the data to a multiplexer within switch port 152 to be transferred to memory A 108.

It should be noted that while bidirectional communication device 200 is transferring the data to a multiplexer in a switch port 152, bidirectional communication device 200 is also able to transfer data and control information or access a desired value within CPU A 102.

As operation of the present inventions has been illustrated through an example, an important aspect of the invention becomes clear. This important aspect includes a bidirectional communication device 200, which allows bidirectional communication between devices in a communication system, such as communication system 100. Early concepts of the bidirectional communication device of the present invention were introduced in U.S. Pat. No. 5,568,064, the subject matter of which is incorporated herein by reference. Later refinements, as will be described hereinafter, appeared in U.S. Pat. No. 5,578,939, issued on Nov. 26, 1996, the subject matter of which is incorporated herein by reference, in U.S. patent application Ser. No. 08/738,317, filed Aug. 26, 1996, the subject matter of which is incorporated herein by reference, and in U.S. patent application Ser. No. 08/703,318, filed Aug. 26, 1996, the subject matter of which is also incorporated herein by reference.

A portion of bidirectional communication device 200 is illustrated in FIG. 3. During operation of the portion of bidirectional communication device 200, reference signals $V_{TT}$ and $V_B$ are provided to bidirectional circuit 200. Bidirectional circuit 200 utilizes the reference signal to bidirectionally communicate information to Data I/O 116 and provide data to output device 204 to be output.

Key to implementation of the portion of bidirectional communication device of FIG. 3 is concurrent bidirectional circuit 300. Bidirectional circuit 300 is illustrated in greater detail in FIG. 4. Accurate generation of current source signals, detection of current levels, and conversions of binary values are accomplished through the use of reference generator 400. Reference generators among each of the plurality of switches comprising switch circuit 106 are linked by the Reference Signal, $V_{TT}$. A voltage on the Reference Signal establishes a mutually derived voltage level which is then used by each reference generator to accurately replicate corresponding levels of transmitted current $$\left(\frac{I_T}{n}\right),$$

bias current ($I_B$) and reference bias voltage ($V_B$).

During operation, reference generator 400 provides a transmission current signal $$\frac{I_T}{n}$$

to switched current source device 402 and a bias current signal level $I_B$ to current source 406. Bias current signal $I_B$ generates a bias current of level $i_B$ in current source 406. Similarly, the $$\frac{I_T}{n}$$

signal enables switched current source device 402 to provide a transmission current level, $$\frac{I_T}{n},$$

when the Data Out signal enables switched current source device 402. When data on the Data Out signal is at a logic 0 level, switched current source device 402 produces no output. Thus, switched current source device 402 modulates between a logic 0 output and output $i_T$ depending on the binary state of the data on the Data Out signal.

As previously mentioned, reference generators for each of the plurality of switch ports of switch device 106 are connected via the Reference Signal. The Reference Signal provides a commonly defined voltage which can be used to precisely establish bias and transmission signals, namely $V_B$, $I_B$, and $I_T$. FIG. 5 provides a more detailed illustration of reference generator 400. During operation, a reference generator 400 uses the $V_B$ signal to balance the currents $I_T$ flowing in terminators 502 and 500. The currents $I_T$ flowing in terminator 502 is current mirror generated by field effect transistor 510, as effected by the interconnection with the Reference Signal. The current $i_T$ flowing in field effect transistor 508 is a direct current mirror output. The current $i_T$ flowing in field effect transistor 512 is a current mirror of the current in field effect transistor 514 and appears as a signal output $I_T$ for current mirror matching. Current $i_T$ flows through accurate resistors 520 and 522. Each of resistors 520 and 522 preferably has a value $Z_O$ representing a characteristic impedance of the lines of data buses, such as A Data In bus 116. Amplifier 518 adjusts the level of signal $i_T$, accordingly.

Bias signal $I_B$ is generated through the current mirror operation of field effect transistors 526 and 524 which are responsive to amplifier 530. Amplifier 530 detects the signal through the earlier noted characteristic impedance resistors 520 and 522, in relation to the bias current effects on terminator 504.

Further refinements of reference generator 400, as illustrated in FIG. 5, are described in the aforementioned, co-pending U.S. patent application Ser. No. 08/703,317, filed Aug. 26, 1996, which is hereby incorporated by reference.

FIG. 6 illustrates a terminator, such as terminators 500, 502, and 504 of FIG. 5. In FIG. 6, transistor 602 is biased by a supply voltage $V_{DD}$ common to the other field effect transistor devices in the communication system. Transistor 604, however, is subject to a gate drive defined by the $V_B$ reference voltage. The current being terminated, various levels of $i_T$ and $i_B$, generate an output signal from node 608 suitable for current mirror replication in the manner used repeatedly in the present invention. The active terminator in FIG. 6 is selected to maximize the match of transistor characteristics as may appear on different integrated circuit devices and be further effected by temperature variations in the communication system of the present invention.

An implementation of high speed current source switch 402 appears in FIG. 7 of the illustrations. The switch is driven by the Data Out signal and is utilized to enable current source 408 of FIG. 4 with minimum delay. The current sources, $$\frac{i_T}{n},$$

are generated through current mirror scaled replication of signal $i_T$ from reference generator 400 of FIG. 5.

It is apparent from the disclosure provided above that the present invention provides a system and method for implementing a cross-bar switch in a multi-processor system. As implemented, the present invention implements a transmission network which allows bidirectional communication between a device ad the cross-bar switch such that information may be transferred simultaneously. Furthermore, the cross-bar switch does not have to be informed of the actions of the integrated circuit device before communication link may be established. Stated another way, the concurrent bidirectional transmitter utilized herein allows a transmission of control information to the switch while the switch communicates to an integrated circuit device over the same transmission lines. The implementation of the invention described herein is provided by way of example. Many other implementations may exist for executing the functions described herein.

Thus, the present invention provides a cross-bar switch which has been designed to control the flow of information. A first task performed by the cross-bar switch of the present invention allows a maximum amount of information to be communicated between N communicating units. To perform this first task, the cross-bar switch of the present invention implements a protocol for establishing connections, for making the connections on a bus-to-bus basis, and a manner of determining when devices should be connected. Furthermore, the protocol of the present invention buffers the data until a channel is clear or a later point in time when a connection is not immediately possible. The present invention allows communication between devices by merely requesting the switch perform a connecting operation. In the previously described prior art switches, a unit had to both ask for this request operation, as well as determine whether the switch would transmit or receive the information. In contrast, the present invention implements a switch which has the ability to create a new form of communication which allows a first device to send information to a second device, while the first device is receiving information from a third device. This bidirectional communication is accomplished by the concurrent nature of the communication link implemented by the present invention. Furthermore, the nature of the information may be altered to be either data or control so that a device may request a new communication link for transmitting information, while receiving data on the same line.

While there have been described herein the principles of the invention, it is to be clearly understood to those skilled in the art that this description is made by way of example only and not as a limited to the scope of the invention. Accordingly, it is intended, by the appended claims, to cover all modifications of the invention which fall within the true spirit and scope of the invention.

What is claimed is:

1. A data processing system, comprising:
    a first data processor;
    a first information bus having a first end coupled to the first data processor and a second end; and
    a first cross-bar switch coupled to the second end of the first information bus, wherein the cross-bar switch concurrently communicates a first data value with the first data processor and a first control value with the first data processor using the first information bus.

2. The data processing system of claim 1 wherein the first cross-bar switch concurrently receives the first data value from the first data processor and transmits the first control value to the first data processor using the first information bus.

3. The data processing system of claim 1, wherein the first cross-bar switch comprises:
    a bidirectional communication device having a first input coupled to the first information bus to communicate the first data value and the first control value concurrently with the first data processor.

4. The data processing system of claim 3, wherein the first cross-bar switch further comprises:
    a routing control circuit coupled to the first information bus to receive a first control value; and
    a multiplexer coupled to the bidirectional communication device for receiving an output value and coupled to the routing control circuit to receive the first control value, the multiplexer selectively outputting the output value in response to the first control value.

5. The data processing system of claim 1 further comprising:
    a second data processor operable for coupling to the first data processor;
    a second information bus having a first end coupled to the second data processor and a second end; and
    a second cross-bar switch coupled to the second end of the second information bus, wherein the second cross-bar switch concurrently communicates a second data value with the second data processor and a second control value with the second data processor using the second information bus.

6. The data processing system of claim 5 wherein the first data processor is one of a central processing unit, a memory, and an input/output device.

7. The data processing system of claim 5 wherein the second data processor is one of a central processing unit, a memory, and an input/output device.

8. The data processing system of claim 5 wherein the first cross-bar switch is coupled to the second cross-bar switch.

9. The data processing system of claim 8 wherein the first cross-bar switch transfers the first data value from the first data processor to the second cross-bar switch.

13

10. The data processing system of claim 9 wherein the second cross-bar switch transfers the first data value to the second data processor and concurrently receives the second control value from the second data processor.

11. A data processing system, comprising:

a first data processor;

a first information bus having a first end coupled to the first data processor and a second end; and a first cross-bar switch coupled to the second end of the first information bus, wherein the cross-bar switch concurrently communicates a first data value with the first data processor and a first control value with the first data processor using the first information bus, wherein the first cross-bar switch comprises:

a bidirectional communication device having a first input coupled to the first information bus to communicate the first data value and the first control value concurrently with the first data processor, and wherein the bi-directional communication device further comprises:

a first multiplexer coupled to the first information bus to receive a first data signal, a first control signal, and a select signal, the first multiplexer providing a second data signal;

a reference generator coupled to the first information bus to communicate a reference voltage value, the reference generator generating a first current value, a second value, and the first voltage value;

a current source generator coupled to the reference generator to receive the first current value and coupled to the first multiplexer to receive the first data signal, the current source generated providing a third current value;

a first current generator coupled to the current source generator for receiving a third current value and providing a threshold current;

a second current generator coupled to the reference generator receiving the second current value and providing a bias current; and a terminator coupled to the reference generator for receiving the first voltage value, coupled to the first current generator for receiving the threshold current; and coupled to the second current generator for receiving the bias current.

12. A bidirectional cross-bar switch, comprising:

a first information bus for providing a first plurality of information values;

first input means for receiving a second plurality of information values; and a bidirectional circuit coupled to the first information bus to receive the first plurality of information values and coupled to the first input means to receive the second plurality of information values, the bidirectional circuit receiving the first plurality of information values on the first information bus while concurrently transmitting the second plurality of information values on the first information bus.

13. The bidirectional cross-bar switch of claim 12 wherein the first input means comprises a multiplexer.

14. The bidirectional cross-bar switch of claim 12 wherein the first input means provides a first data signal.

15. A bidirectional cross-bar switch, comprising:

a first information bus for providing a first plurality of information values;

first input means for receiving a second plurality of information values; and

14 a bidirectional circuit coupled to the first information bus to receive the first plurality of information values and coupled to the first input means to receive the second plurality of information values, the bidirectional circuit receiving the first plurality of information values on the first information bus while concurrently transmitting the second plurality of information values on the first information bus, wherein the first input means provides a first data signal, and wherein the bidirectional circuit, further comprises:

a reference generator coupled to the first information bus to communicate a reference voltage value, the reference generator generating a first current value, a second current value, and a first voltage value;

a current source generator coupled to the reference generator to receive the first current value and coupled to a first multiplexer to receive the first plurality of information values, the current source generator providing a third current value;

a first current generator coupled to the current source generator for receiving the third current value and providing a threshold current;

a second current generator coupled to the reference generator for receiving the second current value and providing a bias current; and a terminator coupled to the reference generator for receiving the first voltage value, coupled to the first current generator for receiving the threshold current, and coupled to the second current generator for receiving the bias current.

16. A method for communicating information using a first switch in a data processing system, comprising the steps of:

coupling a first data processor to a first end of a first information bus;

coupling the first switch to a second end of the first information bus;

concurrently enabling the first switch to communicate a first data value with the first data processor; and enabling the first switch to communicate a first control value with the first data processor using the first information bus.

17. The method of claim 16, further comprising the steps of:

enabling the first switch to receive the first data value from the first data processor using the first information bus; and enabling the first switch to concurrently transmit the first control value to the first data processor using the first information bus.

18. The method of claim 16, further comprising the steps of:

enabling the first switch to receive the first control value from the first data processor using the first information bus; and enabling the first switch to concurrently transmit the first data value to the first data processor using the first information bus.

19. The method of claim 16, further comprising the steps of:

providing a second switch;

coupling a second data processor to a first end of a second information bus;

coupling the second switch to a second end of the second information bus;

enabling the second switch to communicate a second data value with the second data processor; and enabling the second switch to communicate a second control value with the second data processor using the first information bus.

20. The method of claim 19, further comprising the steps of:

transferring the second data value to the second data processor using the second information bus; and concurrently receiving the second control value from the second information bus.

* * * * *